T. MIYAGI.
BOLT AND NUT.
APPLICATION FILED JUNE 23, 1919.
1,367,072.
Patented Feb. 1, 1921.
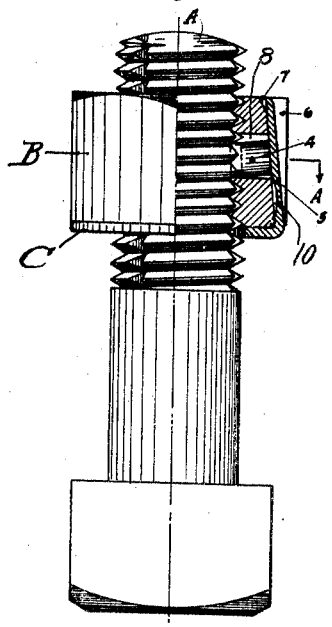
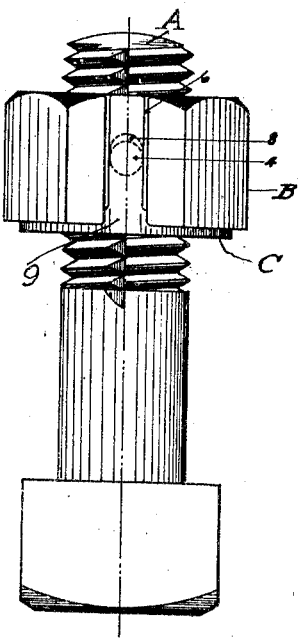
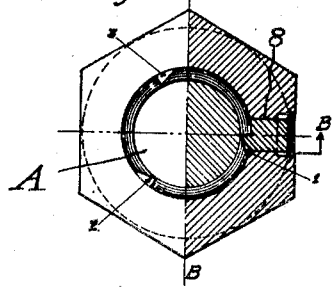
Inventor.
Takeo Miyagi,

UNITED STATES PATENT OFFICE.

TAKEO MIYAGI, OF WAIPAHU, HONOLULU, TERRITORY OF HAWAII.

BOLT AND NUT.

1,367,072. Specification of Letters Patent. Patented Feb. 1, 1921.

Application filed June 23, 1919. Serial No. 306,241.

*To all whom it may concern:*

Be it known that I, TAKEO MIYAGI, of Waipahu, city and county of Honolulu, Territory of Hawaii, a subject of the Emperor of Japan, have invented a new and useful Bolt and Nut, of which the following is the specification.

The present invention has reference to a means for locking a nut on a bolt.

An object is to produce a simple construction and arrangement of parts whereby a nut can be screwed in a homeward direction upon a bolt, automatically locked thereto to prevent the turning in an unscrewing direction and having means whereby the same may be readily screwed off the bolt when desired.

A further object is to provide, in combination with a nut and a bolt, a removable spring influenced element that passes through an opening in the nut and co-engages with the threads of the bolt in a manner to prevent the accidental unscrewing of the nut, regardless of the vibrations imparted to the structure connected by the nut and bolt, or regardless of any direct pressure imparted to either the nut or bolt.

The foregoing objects, and others which will appear as the nature of the invention is better understood, may be accomplished by a simple construction, combination and operative arrangement of parts, such as is illustrated by the drawings.

In the drawings:—

Figure 1 is an elevation illustrating a nut and bolt connected in accordance with this invention.

Fig. 2 is a similar view, looking at a right angle to Fig. 1, parts being broken away, and parts being in section.

Fig. 3 is a plan view with parts in section.

In the drawings a bolt of the ordinary construction is indicated by the character A. This bolt, at the threaded portion thereof has three equi-distantly spaced longitudinally arranged grooves, indicated by the characters 1, 2 and 3 respectively. One of the walls provided by each of the grooves is arranged at an angle or inclination and the other wall is straight.

The nut, indicated by the character B is also of the usual construction and threadedly engages the bolt A.

However, in carrying out my invention I channel longitudinally one of the sides of the nut, as indicated by the numeral 6. The inner wall of the channel is beveled or arranged at an inward inclination from the inner to the outer face of the nut, and the said inclined wall, at the deepest portion of the channel is notched as at 7.

The nut B has an opening 8 between the inner inclined wall of the channel and the bore of the said nut.

On the bolt, and contacting with the inner face of the nut B is a washer C. This washer is integrally formed with an outstanding finger 5 formed at the periphery of the said washer, and this finger enters the channel 6. The lower portion of the finger 5, or the portion thereof adjacent to the connection of the finger with the washer C is wider than the remainder of the said finger. This widened portion is indicated for distinction by the numeral 9 and is designed to contact with the side walls of the channel 6, and by such engagement to sustain the washer on the inner face of the nut and the finger in the channel. From the said widened portion 9, the finger on its inner face has a transverse depression or concavity 10, which adds to the resiliency of the outer and reduced portion of the said finger, permitting the latter to spring into contacting engagement with the inner angle wall of the channel 6. The finger carries a detent 4 which is received in the opening 8 in the nut B, and the detent 4 has its outer face formed, on one side thereof with a projecting tooth 11 that has its outer wall cut at an angle so that the inner face of the tooth will contact with the straight shoulder provided by one of the grooves in the bolt and the angle surface thereof will engage with the angle wall provided by the said groove.

By reference to the drawings, when taken in connection with the foregoing description, it will be manifest that the nut can be turned on the bolt to screw the same in a homeward direction, and the straight end of the tooth of the detent engaging with the straight wall provided by any of the grooves in the bolt will hold the nut against turning in an unscrewing direction. Should it be desirable, however, to remove the nut from the bolt, a wedge member may be inserted in the notch 7 to contact with the inner face of the spring finger 5 to cause the toothed end of the detent to be brought out of engagement with the grooves in the bolt.

The construction, it will be noted, is very simple. By channeling any ordinary nut and by grooving any ordinary bolt, the improved locking means may be readily associated therewith. No removable means is provided for securing the washer on the nut, and by concaving or otherwise depressing the spring finger the outer and reduced end thereof will at all times contact with the inner angle wall of the channel so that regardless of shock or friction the nut will be retained locked on the bolt. It is also to be noted that the finger does not project outward of the channel, so that any element contacting with the outer face of the nut will not influence the finger to retract the detent.

Having described the invention, what I claim:—

1. In combination with a bolt having a grooved shank, a nut screwed on the bolt, said nut having one of its sides channeled and provided with an opening between its bore and the channel; of locking means for the nut and bolt, comprising a spring finger that has a widened portion which frictionally contacts with the side walls of the channel, and a detent carried by the reduced extension of the finger that passes through the opening in the nut, and engages with one of the grooves of the bolt.

2. In combination with a bolt having its shank grooved longitudinally and a nut screwed on the bolt, said nut having one of its sides channeled and the inner wall of the channel being arranged at an inclination, said nut having an opening between the inner wall of the channel and its bore; of a means for locking the nut on the bolt, comprising a washer arranged on the inner face of the nut and having an angle spring finger which is widened at the lower portion thereof to frictionally contact with the opposite walls of the channel in the nut, said finger having its inner face, adjacent to its widened portion depressed transversely whereby to add to the resiliency of the outer and reduced portion of the finger to cause the latter to contact with the inner angle wall of the channel, a detent carried by the finger received in the opening in the nut and said detent having its outer face provided with a projecting tooth designed to engage in the groove of the bolt.

3. In combination with a bolt having a grooved shank, a nut screwed on the bolt having one of its sides channeled longitudinally and the inner wall of the channel being inclined inwardly from the inner to the outer face of the nut and the outer face of the nut having a notch which enters the channel, and said nut having an opening between the channel and the bore thereof; of a means for locking the nut on the bolt, comprising a washer arranged on the inner face of the nut and through which the bolt passes, said washer having an integral spring finger extending angularly from the periphery thereof and which enters the channel of the nut and which has its lower portion widened to frictionally contact with the side walls of the nut for holding the washer on the nut, said finger being of a length not greater than the length of the channel and having its outer portion of a greater resiliency than its inner portion, whereby the said outer portion will spring into contacting engagement with the angle wall of the channel, a detent on the finger received in the opening in the nut, and a projecting tooth on the outer end of the finger received in the groove of the bolt.

TAKEO MIYAGI.